United States Patent [19]

Yamanishi

[11] Patent Number: 5,724,444
[45] Date of Patent: Mar. 3, 1998

[54] IMAGE FORMING APPARATUS

[75] Inventor: Eiichi Yamanishi, Yokohama, Japan

[73] Assignee: Kabushiki Kaisha Toshiba, Kawasaki, Japan

[21] Appl. No.: 475,650

[22] Filed: Jun. 7, 1995

[30]     Foreign Application Priority Data

Sep. 16, 1994   [JP]   Japan .................................. 6-221627

[51] Int. Cl.⁶ .................................................. G06K 9/38
[52] U.S. Cl. ........................... 382/168; 382/271; 358/466
[58] Field of Search .................................. 382/169, 172, 382/271, 168; 358/456, 458, 464, 466, 462; 348/691

[56]                References Cited

U.S. PATENT DOCUMENTS

| | | | |
|---|---|---|---|
| 4,214,271 | 7/1980 | Jones et al. | 348/691 |
| 5,289,296 | 2/1994 | Yamada | 358/464 |
| 5,351,313 | 9/1994 | Bessho | 382/271 |
| 5,438,633 | 8/1995 | Ghaderi | 358/466 |
| 5,502,776 | 3/1996 | Manabe | 358/466 |

FOREIGN PATENT DOCUMENTS

| | | |
|---|---|---|
| 64-6588 | 2/1989 | Japan . |
| 3-30143 | 4/1991 | Japan . |

*Primary Examiner*—Dwayne Bost
*Assistant Examiner*—Brian L. Johnson
*Attorney, Agent, or Firm*—Foley & Lardner

[57]                ABSTRACT

An apparatus comprising a scanner, a histogram preparation circuit, a circuit for analyzing a histogram to calculate a background density of a document and a character density, a circuit for correcting an input pixel density based on the background density and character, and a printer for forming an image based on a corrected pixel density. The histogram preparation circuit prepares a density histogram of each scanning line based on the pixel density input from the scanner, and accumulates a frequency (number of pixels) corresponding to each density. However, the frequency of the histogram, which is prepared up to the previous scanning line, is multiplied by a weighting factor in accordance with the number of scanning lines, and the frequency of the histogram of the present scanning line, is also multiplied by a weighting factor in accordance with the number of scanning lines. Thereafter, the results of the multiplication are added, and the density histogram is prepared. Therefore, the total amount of frequency data, which constitutes the density histogram prepared every scanning line, is kept constant.

5 Claims, 10 Drawing Sheets

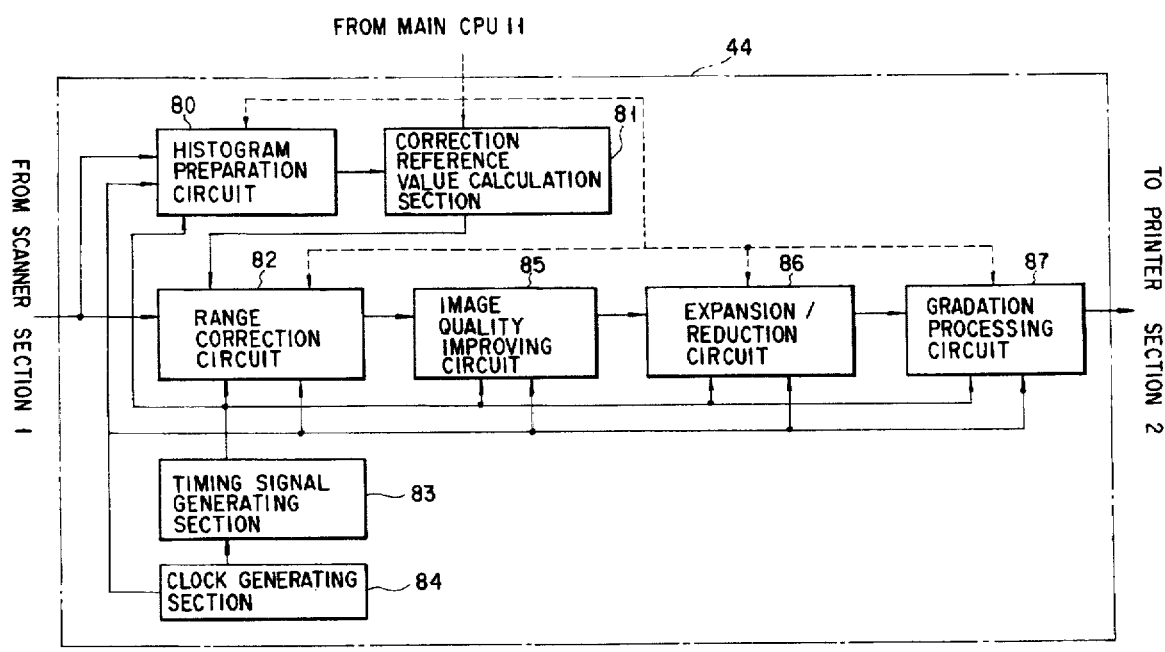
F I G. 3

| DIVISION NUMBER | RANGE OF DENSITY OF PIXEL |
|---|---|
| 0 | 0 ~ F |
| 1 | 10 ~ 1F |
| 2 | 20 ~ 2F |
| 3 | 30 ~ 3F |
| 4 | 40 ~ 4F |
| 5 | 50 ~ 5F |
| 6 | 60 ~ 6F |
| 7 | 70 ~ 7F |
| 8 | 80 ~ 8F |
| 9 | 90 ~ 9F |
| A | A0 ~ AF |
| B | B0 ~ BF |
| C | C0 ~ CF |
| D | D0 ~ DF |
| E | E0 ~ EF |
| F | F0 ~ FF |

| | $\alpha$ |
|---|---|
| 1 | 1 |
| 2 | 1/2 |
| 3 | 1/2 |
| 4 | 1/4 |
| 5 | 1/4 |
| 6 | 1/4 |
| 7 | 1/4 |
| 8 | 1/8 |
| ⋮ | ⋮ |
| 16 | 1/16 |
| ⋮ | ⋮ |
| 32 | 1/32 |
| ⋮ | ⋮ |
| 4096 | 1/4096 |
| ⋮ | ⋮ |
| 8192 | 1/8192 |

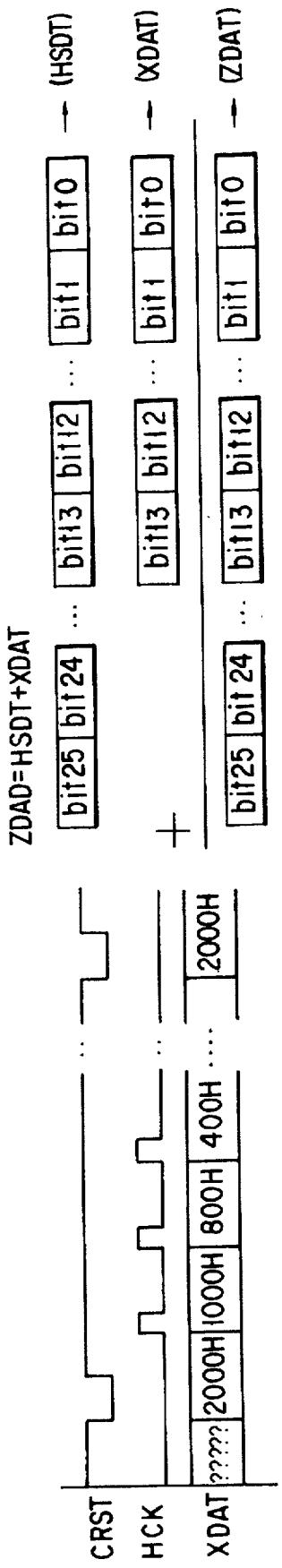

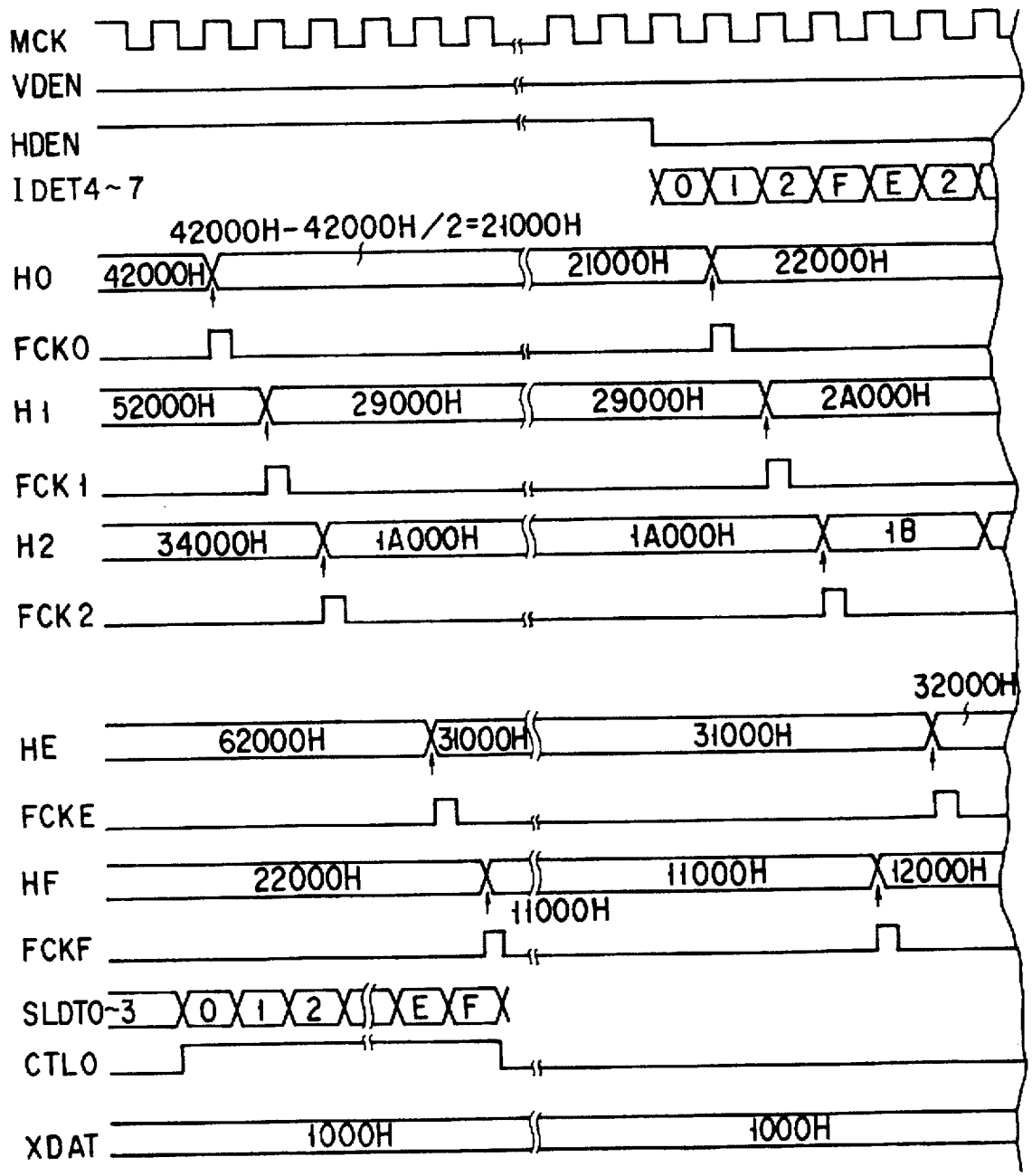
F I G. 13

1

IMAGE FORMING APPARATUS

BACKGROUND OF THE INVENTION

1. Field of the Invention

The present invention relates to an image forming apparatus such as a copy machine, and particularly to a digital electronic copy machine for obtaining a suitable image using a pixel density histogram.

2. Description of the Related Art

In recent years, a digital image forming apparatus such as an electronic copy machine has been widely used in addition to the conventional analog image forming apparatus. The so-called automatic exposing function in which a density of a document illumination lamp is varied as detecting a density of a document is the general function in the analog copy machine. For realizing this function in a digital manner, various types of methods have been conventionally used. A method in which the pixel density histogram is used to obtain a suitable image is the general method, and a method for controlling image quality using a histogram is proposed in Japanese Patent Application KOKOU publication Nos. 64-6588 and 3-30143.

However, there were various problems in preparing a histogram in the methods using the histogram variously proposed. It is assumed that a density histogram is prepared by use of all pixels sampled after scanning the image of the document. In this case, for example, in a case where an A3-document is sampled with accuracy of 16 pixels/mm, the number of pixels is 6×420 mm×16×297 mm=31,933,440, and memories (25 flip-flops) for storing such a number of pixels are needed. Moreover, if a density accuracy of one pixel is 256 levels, the number of memories (flip-flops)= 25×256 are needed.

In order to perform image processing to improve the image quality by use of such a large number of pixels ($2^{25}$ (31,933,440) in maximum), not only the memory having a large capacity but also the large size of the hardware is needed. At the same time, a large amount of processing time is required. Due to this, these are considerable problems in the apparatus as in the copy machine in which real time processing is required.

Moreover, for performing the automatic density adjustment using the histogram, the image is once pre-scanned and the histogram is completed. Thereafter, a reference value for the density adjustment is required. Furthermore, in a case where the histogram is simply prepared at real time as in the conventional case, the number of pixels, which constitutes the histogram, differs in the case when the document image reading is started and the case when the document image reading is ended. Due to this, complicated processings such as change of coefficient in accordance with the number of read scanning lines are needed.

SUMMARY OF THE INVENTION

An object of the present invention is to provide an image forming apparatus, which can adjust automatic density at real time by use of a hardware having a relative simple structure based on a density histogram with a good accuracy.

In order to achieve the above object, according to the present invention, there is provided an image forming apparatus comprising reading means for reading a document in a main scanning direction, and repeating the reading operation along a sub-scanning direction different form the main scanning direction so as to provide a pixel density of each pixel in an image of the document; means for preparing a density histogram based on each pixel density, from the reading means, contained in lines including from a first scanning line to one line before a present scanning line, each pixel density contained in the present scanning line, and a weighting factor being varied in accordance with the number of scanning line counts of the scanning line, the density histogram showing a density distribution of the image and comprising a frequency corresponding to each pixel density; correction reference value calculating means for calculating a correction reference value for a pixel density correction by use of the density histogram of the each scanning line prepared by the preparing means; and and pixel density correcting means for correcting each pixel density from the reading means based on the correction reference value calculated by the correction reference value calculating means, thereby forming an image based on the pixel density corrected by the pixel density correcting means.

The document image is scanned in the main scanning and sub-scanning directions by the scanner, and digital image data corresponding to the document image is provided as pixel density. The density histogram is prepared every main scanning line based on these pixel densities, and a frequency corresponding to each density (the number of pixels) is accumulated. However, the frequencies of the histogram, which is prepared up to the previous scanning line, are multiplied by a weighting factor in accordance with the number of scanning lines, and the frequencies of the histogram of the present scanning line, are also multiplied by a weighting factor in accordance with the number of scanning lines. Thereafter, the results of the multiplication in the previous and present scanning lines are added, and the density histogram is prepared. Therefore, the total amount of frequency data, which constitutes the density histogram prepared every scanning line, is kept constant.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 3 is a view showing a schematic structure of an image processing section of the image forming apparatus of the present invention;

FIG. 9 is a view showing an example of an output of an additional value generating section;

FIG. 10 is a view showing a change of each signal corresponding to a change of a signal FDAT;

FIG. 11 is a view showing an example of an addition of signals ZDAT;

FIG. 13 is a timing chart explaining an operation of the histogram preparation circuit.

DETAILED DESCRIPTION OF THE PREFERRED EMBODIMENT

Embodiments of the present invention will be explained with reference to the drawings.

Figure 1:
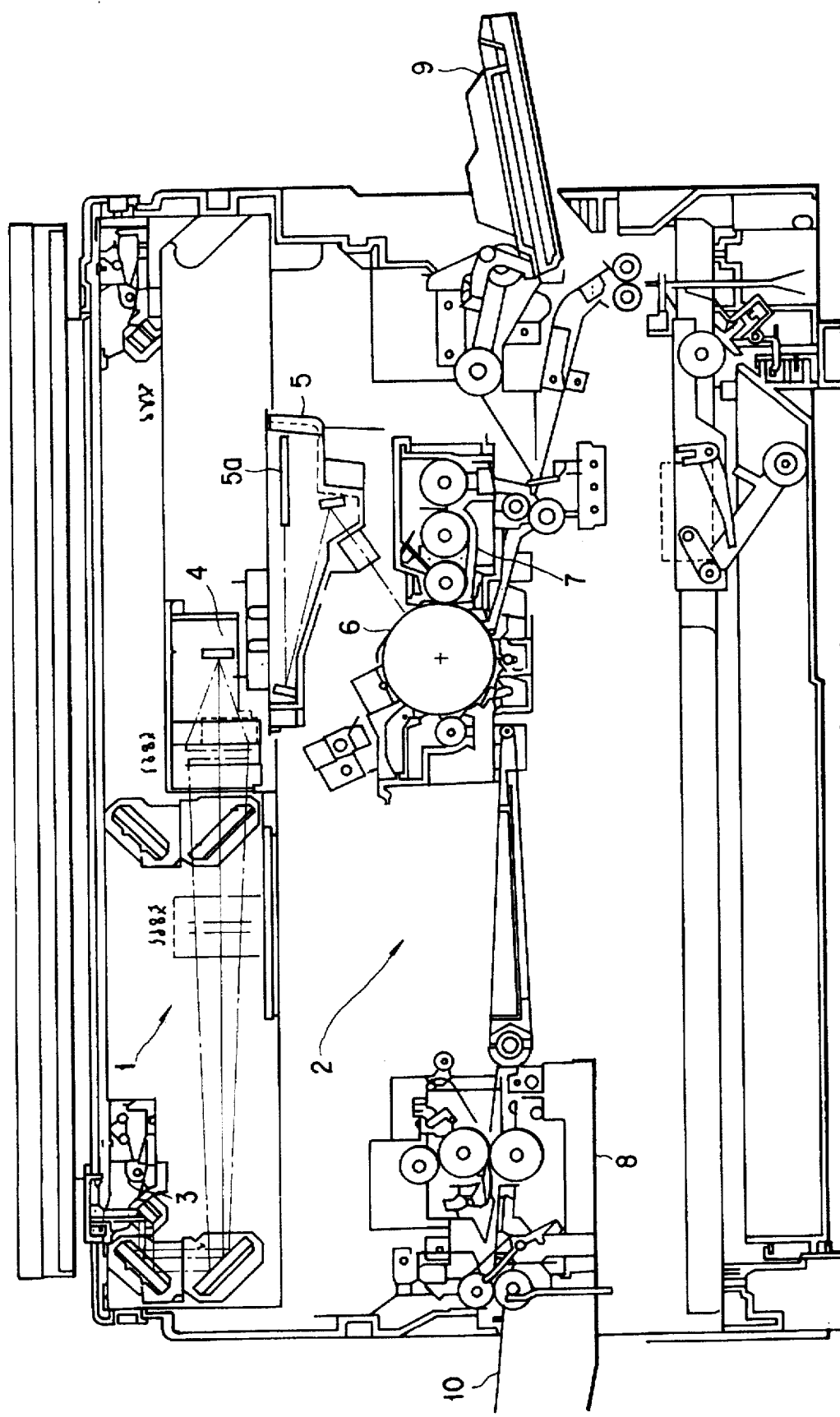
FIG. 1 is a cross sectional view showing a schematic structure of an image forming apparatus of the present invention.

FIG. 1 shows a schematic structure of an image forming apparatus to which the present invention is applied. The image forming apparatus comprises a scanner section 1 for reading a document, and a printer section 2. The scanner section 1 optically scans the document by a light source 3 to introduce a reflected light to a CCD 4, and fetches a document image, serving as a digital image signal, through an A/D converter.

The printer section 2 comprises a laser optical system 5, a photosensitive member 6, a developer 7, a fixing unit 8, a paper feeding tray 9, and a paper discharging tray 10. A semiconductor laser 5a provided in the laser optical system 5 is turned on/off by the digital signal sent from the scanning section 1. The laser beam is reflected by a polygon mirror (not shown), which is rotated by a polygon mirror (not shown), to be scanned, thereby forming an electrostatic image on the photosensitive member 6. The electrostatic image is developed by the developer 7, and the developed image is transferred onto a paper fed from the tray 9, fixed by the fixing unit 8, and discharged onto the tray 10.

Figure 2:
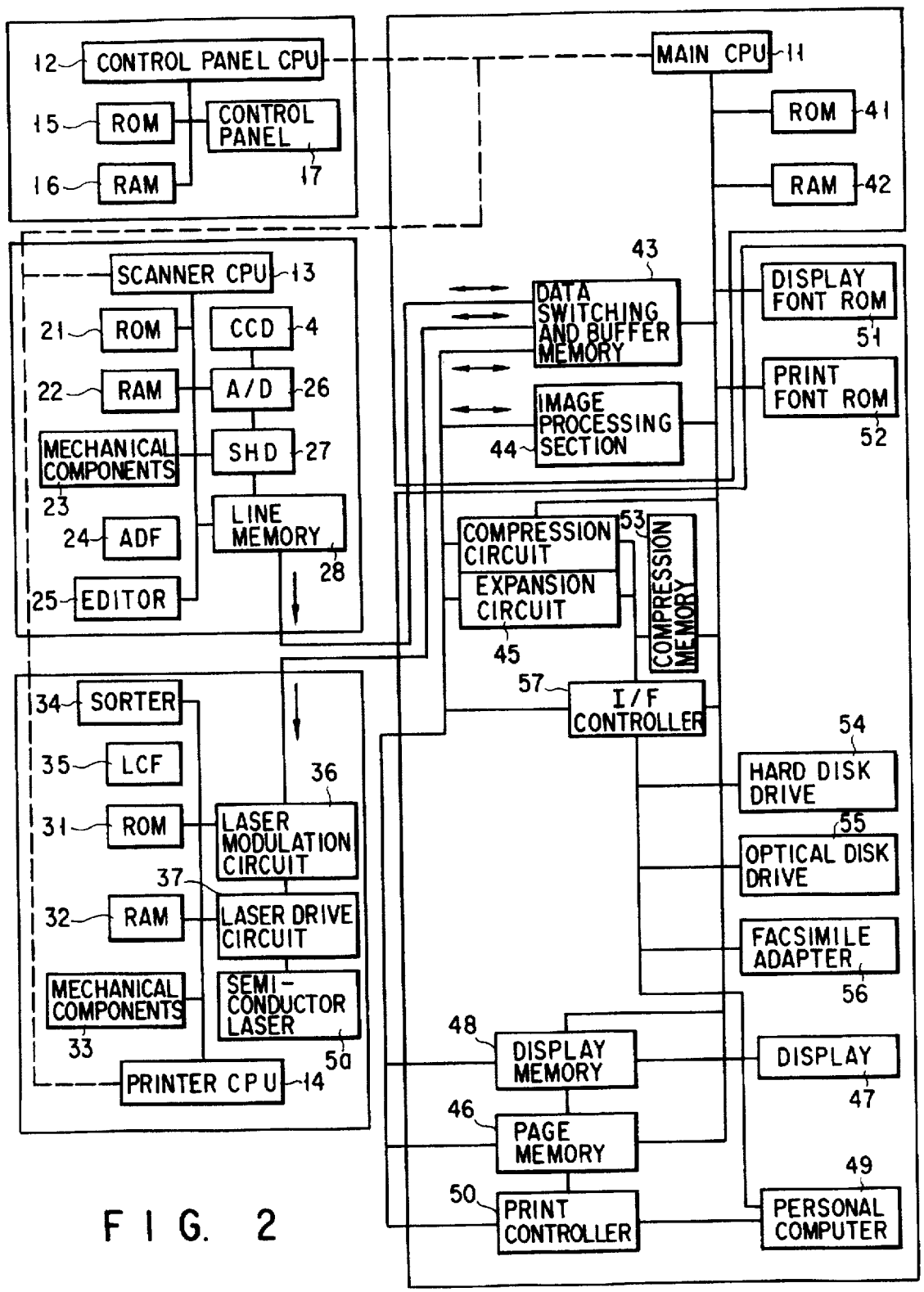
FIG. 2 is a view showing a schematic structure of a control system of the image forming apparatus of the present invention.

FIG. 2 is a block diagram showing a schematic structure of the control system of the image forming apparatus. The apparatus is controlled by a main CPU 11, a control panel CPU 12, a scanner CPU 13, and a printer CPU 14. The main CPU 11 communicates with the control panel CPU 12, the scanner CPU 13 and the printer CPU 14 to control these CPUs.

The control panel CPU 12 is connected to a ROM 15 and a RAM 16. The control panel CPU 12 detects a switch formed on the control panel 17, turns on/off an LED, and controls a display based on data stored in the ROM 15 and the RAM 16. The scanner CPU 13 is controlled by the communication with the main CPU 11. The scanner CPU 13 controls mechanical components 23 such as a motor (not shown), a solenoid (not shown), an ADF (automatic document feeder) 24, an editor 25, an A/D (analog to digital) converter 26, a SHD (shading correcting circuit) 27 and a line memory 27 based on data stored in a ROM 21 and a RAM 22.

The printer CPU 14 is controlled by the communication with the main CPU 11. The printer CPU 14 controls mechanical components 33 such as a motor (not shown), a solenoid (not shown), a sorter 34, an LCF (large cassette feeder) 35, a laser modulation circuit 36, and a laser drive circuit 37 based on data stored in a ROM 31 and a RAM 32.

The main CPU 11 totally controls the image forming apparatus in accordance with a control program stored in a ROM 41 and a RAM 42. A data change and buffer memory 43 changes and buffers where data read by the scanner section 1 should be sent and which data should be sent to the printer section 2. In an image processing section 44, there is provided a circuit for preparing a histogram from image data so as to correct image data based on the prepared histogram. A compressing and expanding circuit 45 performs compression and expansion of image data, and a page memory circuit 46 stores image data every page. A display memory 48 stores image data to be displayed on a display 47. A printer controller 50 expands code data sent from a personal computer 49 to image data. A display font ROM 51 expands code data onto the display memory 48, a print font ROM 52 expands code data onto the page memory 46, and a compression memory 53 stores data compressed by the compressing and expanding circuit 45. In addition to the above-explained components, a hard disk drive 54, an optical disk drive 55, and an I/F controller 57, which carries out an interface with a facsimile adapter 56, are connected to the main CPU 11.

FIG. 3 is a block diagram showing a schematic structure of the image processing section 44 including the histogram preparation circuit according to the present invention. A histogram preparation circuit 80 prepares a density histogram from image data sent from the scanner section 1. A correction reference value calculation section 81 calculates a correction reference value (to be described later) based on the histogram prepared by the histogram preparation circuit 80. A range correction circuit 82 corrects a density range (to be described later) by use of the correction reference value from the correction reference value calculation section 81 to perform the automatic density adjustment at real time. A timing signal generating section 83 generates various timing signals necessary for each block of the image processing section 44 based on a clock signal from a clock generating section 84. An image improving circuit 85 includes a low pass filter, and a high frequency emphasizing circuit to improve the quality of the image range-corrected by the range correction circuit 82. An expansion/reduction circuit 86 expands/reduces an image as required. A gradation processing circuit 87 processes a Gradation of an image by dither or error diffusion method. The above processed image signal is sent to to the printer section 2, and an image is formed.

Figures 4A, 4B, 6:
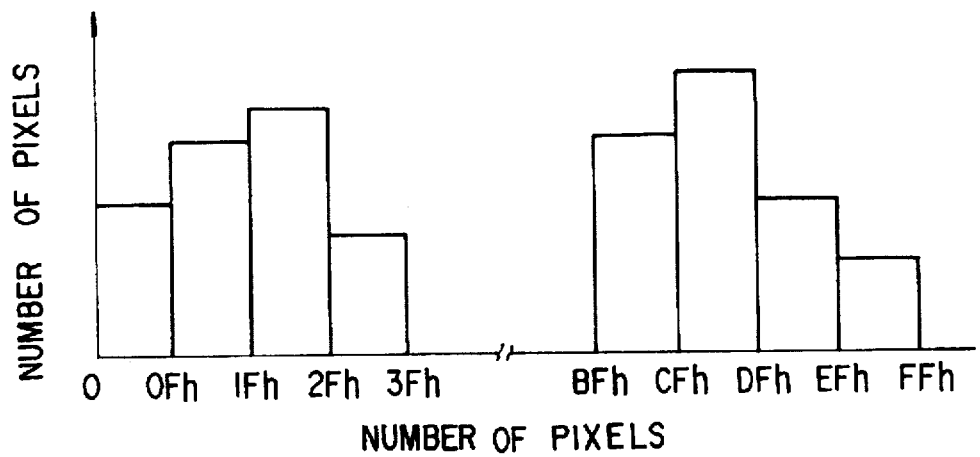
FIGS. 4A and 4B are views explaining a histogram prepared in the present invention.
FIG. 6 is a view explaining the number of sub-scanning lines in a mode 0 and the corresponding factor α.

FIG. 4A shows an outline of a density histogram prepared in the present invention. For example, for reading an image of one A4 paper, if the image is read at 400 dpi, the total number of pixels G is shown as follows:

$$G = 210 \times 297 \times (400/25.4)^2$$

Each pixel has its density, and the density is expressed by 8 bits herein. In FIG. 4A, a horizontal axis shows a density, that is, a pixel value, and a vertical axis is a frequency (number of pixels) showing how many pixels exist at each density of pixel.

As shown in FIG. 4A, according to this embodiment, the density is divided to sixteen, and the density having 256 levels is simplified to 16 levels. In other words, the lower 4 bits of the 8-bit pixel value are ignored. By use of 16 divisions, the hardware can be largely simplified. Even in the case of 16 divisions, an amount of data necessary for the histogram can be fully reserved in the automatic density adjusting function. FIG. 4B shows a method of 16 even divisions, a division number 0 shows a range of the pixel density of 0 to F, a division number 1 shows a range of the pixel density of 10 to 1F, and similarly, the pixel value ranges of division numbers 2 to F are set as shown in FIG. 4B.

Before explaining the histogram preparation circuit 80 in detail, the correction reference value calculation section 81 and the range correction of the range correction circuit 82 will be explained as follows.

The range correction is a function which is used in a background deletion in an automatic exposure function of an analog copy machine.

Figure 5A:
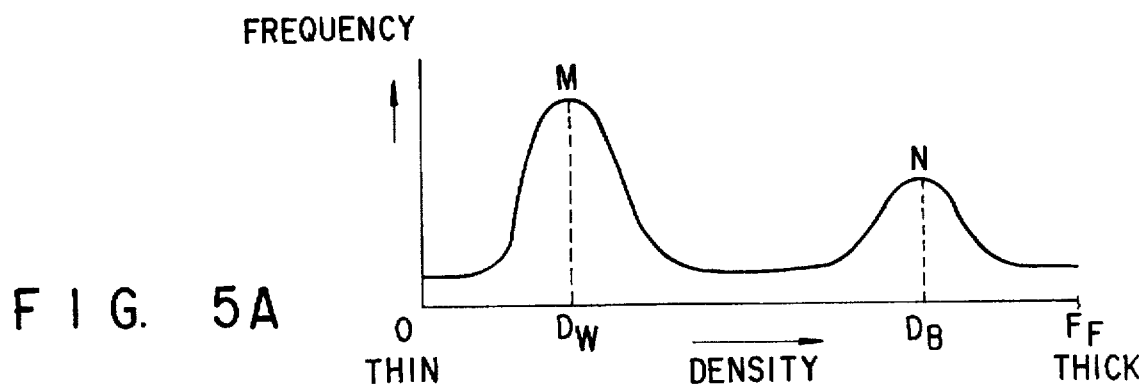
FIGS. 5A and 5B are histogram views explaining a correction reference value and a range correction.

Generally, if the document is digitally read and a density histogram is prepared, the result can be obtained as shown in FIG. 5A. In a case where the document is like a newspaper, one curve whose peak is M can be formed at a background density portion and one curve whose peak is N can be formed at a character density portion. In the analog copy machine, an exposure lamp is controlled such that the background density portion can be excluded. However, since the background density portion cannot be excluded in the digital copy machine, the similar effect can be obtained by the following method.

Figure 5B:
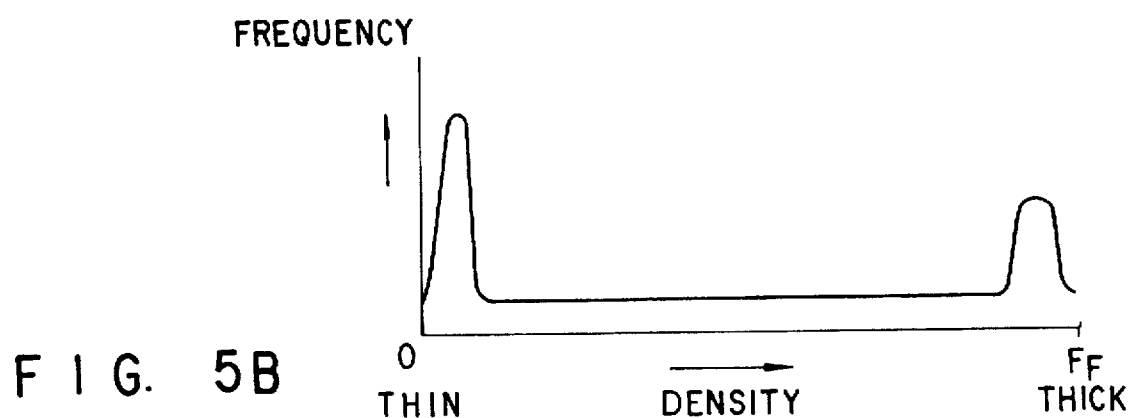

More specifically, density DW corresponding to the peak point of frequency M, and density DB corresponding to the peak point of frequency N are obtained, and the following calculation is performed, so that a density histogram is converted to a distribution as shown in FIG. 5B. The densities DW and DB are denoted as correction reference values, and each correction reference value is calculated by the correction reference value calculation section 81 based on the histogram of each scanning line which is prepared by the histogram preparation circuit 80.

$$DN=(DI-DW) \times FFh/(DB-DW)$$

where DI is an input pixel density, DN is a corrected pixel density, and FFH is a maximum pixel density. In other words, the range (density width) between M to N shown in FIG. 5A is expanded from 0 to FFh.

The following will explain the histogram preparation system of the present invention.

The following equation is a basic calculation expression for preparing the histogram of the present invention. The histogram is prepared every main scanning line. A basic reference value of the range correction is obtained every time when the histogram preparation processing of one line is completed, and the range correction processing is executed based on the obtained reference value. The total amount of data, which constitute the histogram, is a fixed value.

$$A'=A-\alpha A+\alpha B$$

where A': a corrected frequency (number of pixels) corresponding to each density of the present line, A: a frequency corresponding to each density calculated up to the previous line, B: a frequency corresponding to each density of the present line, and $\alpha$: weighting coefficient.

The frequency value accumulated in each line is multiplied by the weighting factor $\alpha$. In other words, the weighting factor $\alpha$ shows a contribution ratio to the histogram. The value of $\alpha$ is set in accordance with the number of lines. Thus, the value is selected from 14 values (1/power of 2), i.e., 1, ½, ¼, ⅛, 1/16, 1/32, ... 1/2048, 1/4096, 1/8192 $(=½^{13})$. The histogram preparation circuit 80 generates a corrected frequency value of the present line, $A'=A-\alpha A+\alpha B$. From the generated histogram, the reference value for a range correction is calculated by the correction reference value calculation section 81.

In the preparation of the histogram, two modes, that is, a mode 0 and a mode 1 are set, either one of modes is selected as required.

Mode 0: a weighting factor varied addition mode depending on the number of scanning lines; and Mode 1: a weighting factor fixed addition mode against the input pixel.

In mode 0, the value of coefficient $\alpha$ is varied in accordance with the number of counts of the main scanning lines to prepare the histogram. In mode 1, the coefficient is fixed, and the histogram is prepared regardless of the count value of the main scanning line.

Figure 7:
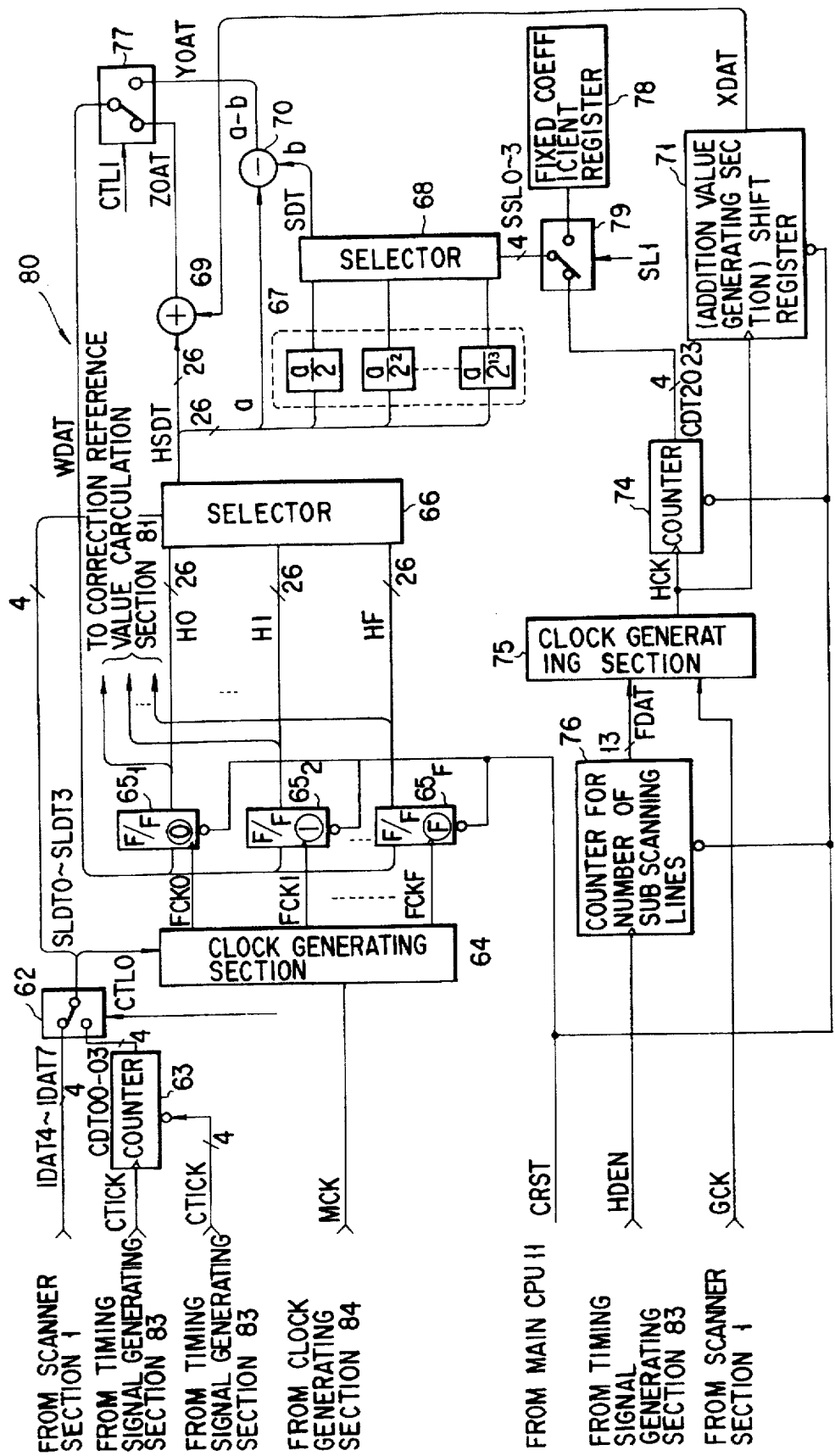
FIG. 7 is a block diagram showing the structure of a histogram preparation circuit in an image forming apparatus of one embodiment of the present invention.

FIG. 7 is a block diagram showing the specific structure of the histogram preparation circuit 80. Pixel density signals IDAT4 to IDAT7 are input to one terminal of a switch 62 from the scanner section 1, and output data signals CDT00 to CDT03 are input to the other terminal from a counter 63. The switch 62 selects either one of the input signals in accordance with a selection signal from the timing signal generating section 83, and outputs the selected signals SLDT0 to SLDT3 to a selector 66 and a clock generating section 64. In this case, the pixel density signals IDAT4 to IDAT7 correspond to upper 4 bits of the pixel density, and the pixel density signals IDAT0 to IDAT3 are ignored for the above-mentioned reason. The timing signal CTL0 sent from the timing signal generating section 83 is in a high level when the pixel density signal is not read, and the switch 62 selects a signal from the counter 63 to be output.

The counter 63 supplies a necessary value to the clock generating section 64 and the selector 66 in calculating $(A')+A-\alpha A$. When the above-mentioned pixel density signal is not read, the counter 63 generates a four-bit count value such that sixteen outputs of the clock generation section 64 are selected in order to be generated. A counter clock signal CTICK is inputted from the timing signal generating section 83, and the counter 63 is cleared by a counter clear signal CTICL from the timing signal generating section 83. The counter clear signal CTICL is in a low level when the pixel density signal is read, and the counter 63 is cleared.

Figure 8:
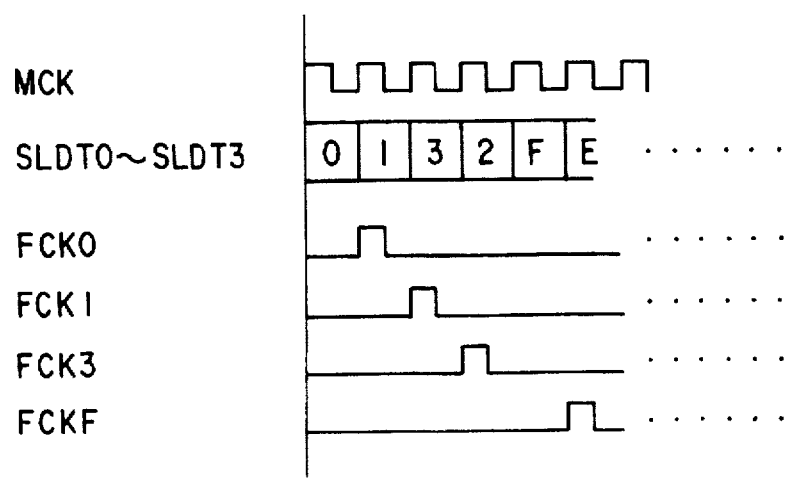
FIG. 8 is a view explaining timing of an output clock signal corresponding to an input pixel density in a clock generating section.

The clock generating section 64 selects one of sixteen outputs FCK0 to F at a period of an input clock signal MCK to be output in accordance with the selection input signals SLDT0 to SLDT3. FIG. 8 shows the relationship I/O signals of the clock generating section 64.

Histogram registers (flip-flop) $65_1$ to $65_F$ latch a corrected frequency (WDAT) against each pixel density to be output when the input clock signals FCK0 to F rise. The input signals WDAT is the above-mentioned $A'-\alpha A$ or $(A')+\alpha B$. Corrected frequency signals H0 to HF sent from the histogram registers $65_1$ to $65_F$ are also output to the correction reference value calculation section 81.

The selector 66 inputs the frequency (the number of pixels) corresponding to each density of 16 divisions from the histogram registers $65_1$ to $65_F$, and selects one data from 16 data of H0 to HF (each bus width is 26 bits) to output a signal HSDT.

Figure 14:
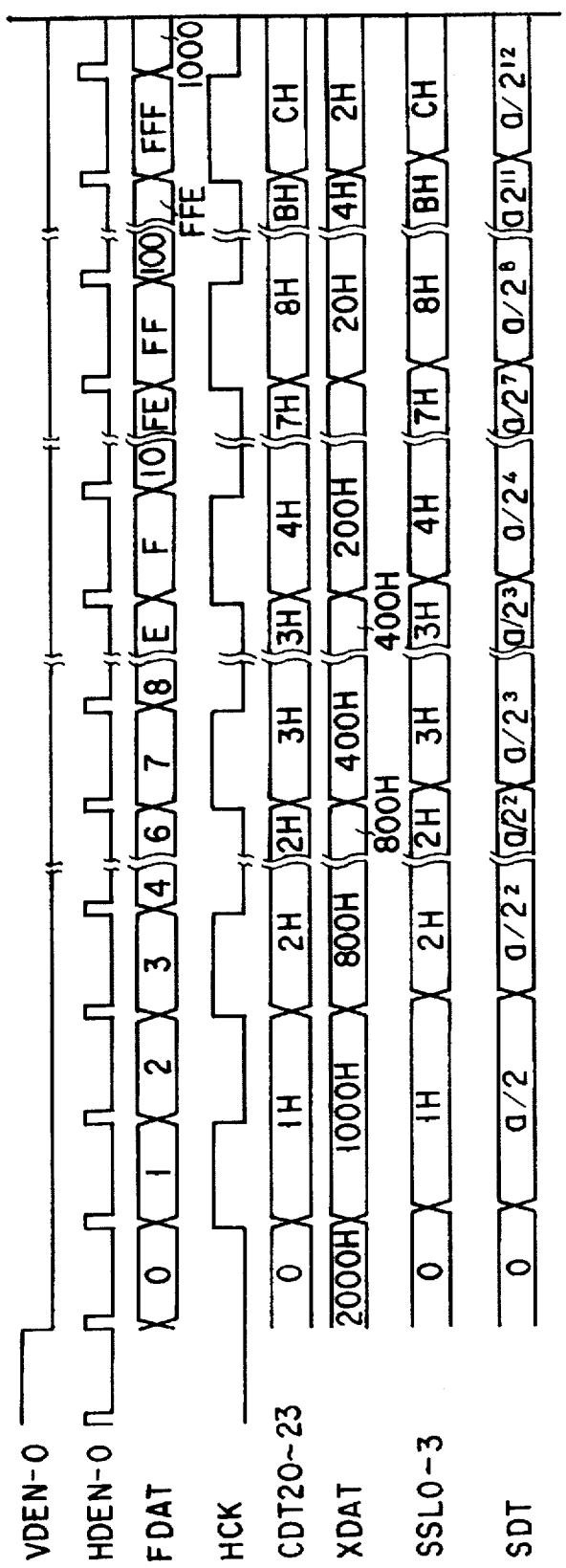
FIG. 14 is a timing chart explaining an operation of the histogram preparation circuit.

As shown in a timing chart of FIG. 14, sub-scanning line number counter 76 inputs a line synch signal HDEN from the timing signal generating section 83, and outputs count value signals FDAT00 to FDAT12 to a clock generating section 75. Then, the counter 76 is cleared by a clear signal CRST sent from the main CPU 11 every time when one page of the document is scanned.

The clock generating section 75 inputs output signals FDAT0 to FDAT12 sent from the sub-scanning line number counter 76, and a pixel synch clock signal GCK sent from the scanner section 1, and outputs a signal HCK to a counter 74 and an addition value generating section 71. When the value of the signal FDAT is one of 1, 3, 7, F, 1F, 3F, 7F, 1FF, 3FF, 7FF, FFF, and 1FFF, the clock generating section 75 outputs one clock of the input pixel synch clock signal. The clock generating section 75 comprises an AND circuit. When all line signal signals FDAT are "1", that is, FDAT=1, 3 (11), 7 (111), F (1111) . . . , the clock generating section 75 outputs one clock.

The counter 74 inputs the clock signal HCK from the clock generating section 75, and outputs count value signals CDT20 to CDT23 to a selector 68 when the mode is set to mode 0. The counter 74 is also cleared by the clear signal CRST sent from the main CPU 11 every time when one page of the document is scanned. The count values CDT20 to CDT23 are values for selecting $\alpha$ as shown in FIG. 6.

A fixed coefficient value register 78 outputs a fixed coefficient value when the mode is set to mode 1. A switch 79 is changed in accordance with a mode signal SL1 sent from the CPU 11. The switch 79 is set to the counter 74 when the mode is set to mode 0, and to the register 78 when the mode is set to mode 1.

A subtraction value generating section 67 outputs "$\alpha A$" in calculating (A')=A−$\alpha A$. The subtraction value generating section 67 inputs the output signal HSDT from the selector 66, and generates a value, which is obtained by dividing the signal HSDT by a power of 2 (the signal HSDT is shifted).

The selector 68 determines "$\alpha A$" of the calculation (A') =A−$\alpha A$, which is performed between the respective liens, that is, when the pixel signal is not read, in accordance with input signals SSL0 to SSL3. In other words, the selector 68 outputs (value of signal HSDT)/2 when the value of the input signal SSL0 to SSL3 is "1", (value of signal HSDT) $/2^2$, . . . when the input value is "2", and (value of signal HSDT)/$2^{13}$ when the input value is C.

A subtraction section 70 performs a subtraction (A')=A− $\alpha A$. The subtraction section 70 inputs the density signal HSDT (A of the above equation) from the selector 66 and a subtraction signal SDT ($\alpha A$ of the above equation) from the selector 68, and outputs a signal YDAT as a result of the subtraction.

The addition value generating section 71 (shift register) generates "$\alpha B$" in calculating A'=(A')+$\alpha B$. The addition value generating section 71 inputs the clock signal HCK from the clock generating section 75, and outputs a signal XDAT to an adding section 69. The addition value generating section 71 is also cleared by the clear signal CRST sent from the main CPU 11 every time when one page of the document is scanned. FIG. 9 shows an example of the output of the addition value generating section 71. At the time of inputting the clear signal CRST, an initial value output is 2000H. Thereafter, every time when the clock signal HCK enters from the clock generating section 75, ½ of the present value is output. Since the output is hexadecimal, ½ of the present value 2000H is 1000H, and ½ of the present value 1000H is 800H. FIG. 10 shows a variation of each signal corresponding to the variation of the signal FDAT.

The adding section 69 carries out addition A'=(A')+$\alpha B$. The adding section 69 inputs the frequency signal HSDT from the selector 66, and the signal XDAT of addition data from the addition value generating section 71, and outputs a signal ZDAT as a result of the addition. FIG. 10 shows an example of the addition of the signal ZDAT.

A switch 77 changes the calculations of (A')=A−$\alpha A$ and A'=(A')+$\alpha B$. The addition result signal ZDAT is input to one terminal of the switch 77 from the adding section 69, and the subtraction result signal YDAT is input to the other terminal from the subtraction section 70. One of these inputs is selected in accordance with a selection signal CTL1, and a selection result signal WDAT is output to the histogram registers $65_1$ to $65_F$.

The preparation of the histogram having the structure shown in FIG. 7 will be explained with reference to timing charts of FIGS. 12, 13, and 14.

Figure 12:
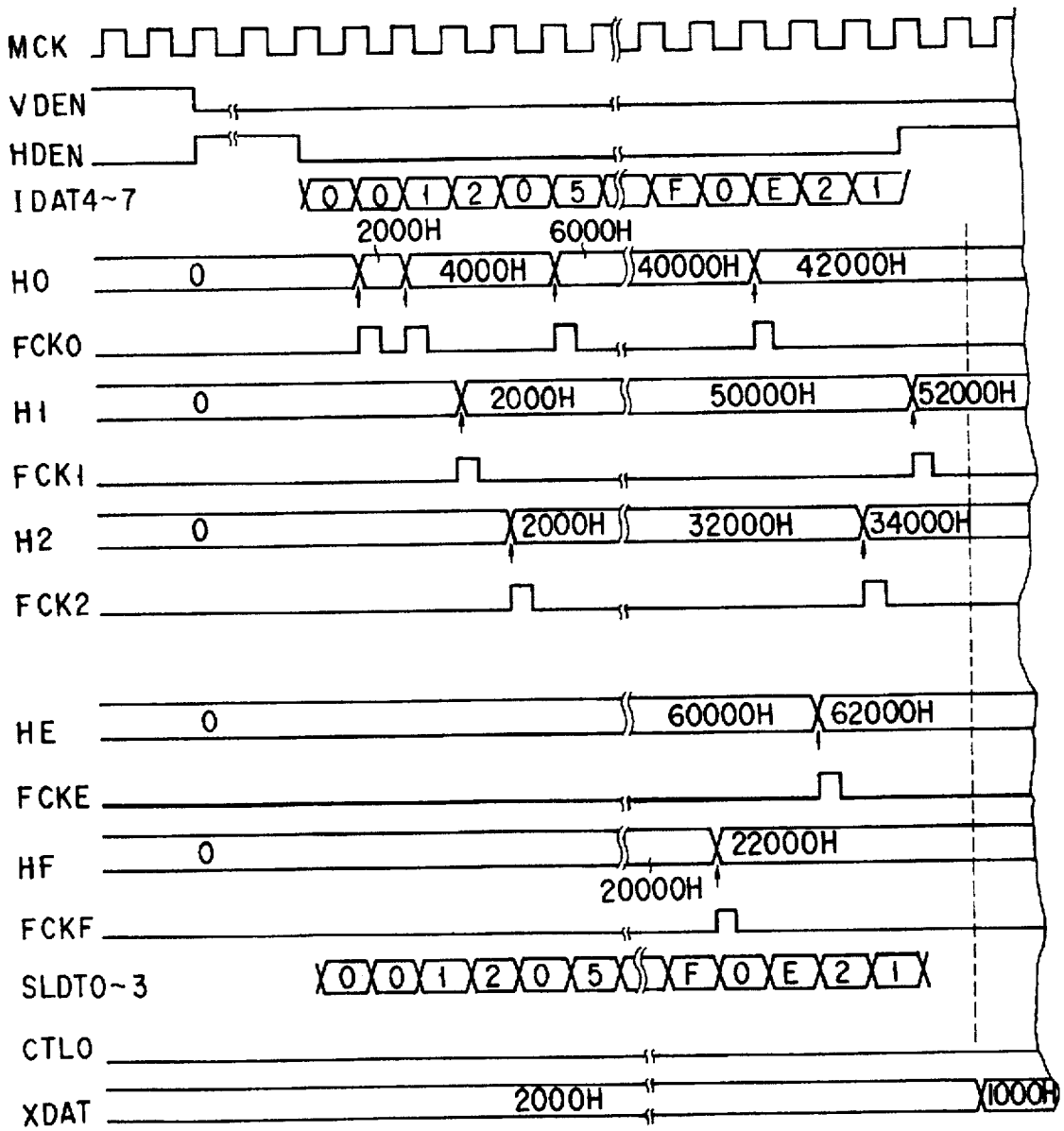
FIG. 12 is a timing chart explaining an operation of the histogram preparation circuit.

FIG. 12 is a timing chart showing a state when A'=(A')+ $\alpha B$ is calculated every input pixel during one line reading. The signal MCK is a main clock and synchronized with the pixel signal. A signal VDEN is a page synch signal, and a signal HDEN is a line synch signal. The pixel density signals IDAT4 to IDAT7 sent from the scanner section 1 are upper four bits of the pixel density, and input to the switch 62. A sub-scanning effective signal CTL0 is enable (low level) in this case. The switch 62 sends inputs IDAT4 to IDAT7 to the selector 66 and the clock generating section 64.

The selector 66 selects the output (frequency) of the histogram registers $65_1$ to $65_F$ in accordance with the pixel signals IDAT4 to IDAT7, that is, the value of the selection input signal, and outputs the selected frequency signal HSDT. A weighting factor (XDAT) is added to the signal HSDT in accordance with the number of lines by the adder section 69. Since the switch 77 is set to the adding section 69 by the input signal CTL1 in this case, the addition result signal ZDAT is returned to the histogram registers $65_1$ to $65_F$.

The clock generating section 64 outputs the clock signals FCK0 to FCKF in accordance with the pixel signals IDAT4 to IDAT7. Each of the histogram registers $65_1$ to $65_F$ latches, i.e., stores the value of the output signal WDAT of the switch 77, when each of the clock signals FCK0 to FCKF rises. The above-mentioned processing is provided every pixel of one line, so that the histogram of one line is generated, and the reference value for adjusting the pixel density is calculated. The reference value is used in the processing of the next line.

During the time, which is from one line read to a next line line read, that is, when the pixel density signal is not input, the equation, (A')=A−$\alpha A$, is calculated to obtain the frequency of each density of the histogram.

FIG. 13 is a timing chart showing a state of the subtraction processing. The switch 62 is changed to the counter 63 by the selection signal CTL0, and the switch 77 is changed to the subtracter 70 by the selection signal CTL1. The selector 68 subtracts each histogram value based on the coefficient (in mode 0), which is determined by the number of sub-scanning counters, or the fixed coefficient (in mode 1). After the subtraction is ended, an operation is moved to the normal histogram preparation. By repeating the above-motioned operations, the histogram in which total amount of data is constant is prepared every time when each main scanning line is read.

As explained above, according to the embodiment of the present invention, the histogram can be obtained every main scanning line, and the automatic density adjustment can be performed at real time. Moreover, the frequency of the histogram, is multiplied by the weighting factor, which is varied in accordance with the number of scanning lines, and the frequency is accumulated. Thereby, the histogram in which total amount of data is constant is prepared every time when each main scanning line is read. Moreover, the prepared histogram shows the shape of the histogram having substantially the same tendency as that of the histogram prepared by the conventional method. Furthermore, in the case that the weighting factor is fixed, there can be obtained the histogram, which can be deal with the case that the density of the image of the document is abruptly changed.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An image forming apparatus comprising:

reading means for reading a document in a main scanning direction, and repeating the reading operation along a sub-scanning direction different from the main scanning direction so as to output a signal representative of a pixel density of each of a range of pixels in each of scanning lines in the document;

calculating means for receiving the signal output from said reading means, and calculating density-frequency data of said each of the scanning lines;

rectified density-frequency data preparing means for rectifying the density-frequency data calculated by said calculating means by use of a weighted coefficient which varies in accordance with a number of scanned scanning lines, thereby preparing rectified density-frequency data;

corrected density-frequency data preparing means for preparing, each time said each of the scanning lines is scanned, corrected density-frequency data of the first scanning line through said each of the scanning lines by using both corrected density-frequency data prepared when a previous scanning line which precedes said each of the scanning lines has been scanned, and the rectified density-frequency data prepared by said rectified density-frequency data preparing means, wherein a total amount of the corrected density-frequency data prepared by said corrected density-frequency data preparing means is smaller than a total amount of non-corrected density-frequency data of the first scanning line through said each of the scanning lines;

correction reference value calculating means for calculating a correction reference value for a pixel density correction by using the corrected density-frequency data prepared by said corrected density-frequency data preparing means, each time said each of the scanning lines is scanned;

pixel density correcting means for correcting the pixel density of said each of the range of pixels of said each of the scanning lines based on the correction reference value; and image forming means for forming an image based on the pixel density corrected by said pixel density correcting means.

2. The apparatus according to claim 1, wherein said correction reference value calculating means comprises detecting means for detecting two typical densities, one for a background of said document and another for characters as correction reference values, each time said each of the scanning lines is scanned, from the corrected density-frequency data prepared by said corrected density-frequency data preparing means, and wherein said pixel density correcting means comprises means for correcting said pixel density in accordance with the following equation:

$$DN = (DI - DW) \times FFh/(DB - DW)$$

where DI: input pixel density, DW: typical background density, DB: typical character density, FFh: maximum density shown in hexadecimal, DN: corrected pixel density.

3. The apparatus according to claim 1, wherein said rectified density-frequency data preparing means includes means for providing a first multiplication result which is obtained by multiplying the density-frequency data calculated by said calculating means by a first weighting coefficient which varies in accordance with the number of scanned scanning lines; and wherein said corrected density-frequency data preparing means includes:

means for providing a second multiplication result which is obtained by multiplying the corrected density-frequency data prepared when the previous scanning line has been scanned, by a second weighting coefficient which varies in accordance with the number of scanned scanning lines; and means for subtracting the second multiplication result from the corrected density-frequency data prepared when the previous scanning line has been scanned, thereby obtaining a value, and then adding the first multiplication result to the value.

4. The apparatus according to claim 3, wherein said range of pixels corresponds to N different types of pixels, N being an integer greater than one, and wherein said calculating means groups said N different types of pixels into M different groups of pixels when calculating the density-frequency data of said each of the scanning lines, M being an integer less than N.

5. An image forming method, comprising the steps of:

a) reading a document in a main scanning direction, and repeating the reading operation along a sub-scanning direction different from the main scanning direction so as to output a signal representative of a pixel density of each of a range of pixels in each of scanning lines in the document;

b) receiving the signal output in the step a), and calculating density-frequency data of said each of the scanning lines;

c) rectifying the density-frequency data calculated in the step b) by use of a weighting coefficient which varies in accordance with a number of scanned scanning lines, thereby obtaining rectified density-frequency data;

d) preparing, each time said each of the scanning lines is scanned, corrected density-frequency data of the first scanning line through said each of the scanning lines by using both corrected density-frequency data prepared when a previous scanning line which precedes said each of the scanning lines has been scanned, and the rectified density-frequency data obtained in the step c), wherein a total amount of the corrected density-frequency data prepared is smaller than a total amount of non-corrected density-frequency data of the first scanning line through said each of the scanning lines;

e) calculating a correction reference value for a pixel density correction by using the corrected density-frequency data prepared in the step d), each time said each of the scanning lines is scanned;

f) correcting the pixel density of said each of the range of pixels of said each of the scanning lines based on the correction reference value obtained in the step e); and g) forming an image based on the corrected pixel density obtained in the step f).

* * * * *